US009031931B2

(12) United States Patent
Surry et al.

(10) Patent No.: US 9,031,931 B2
(45) Date of Patent: May 12, 2015

(54) SYSTEMS AND METHODS FOR PROVIDING QUERY RESULTS TO A USER IN AN INTUITIVE GRAPHICAL FORMAT (71) Applicant: Pitney Bowes Inc., Stamford, CT (US)

(72) Inventors: Patrick D. Surry, Newtonville, MA (US); Ellen M. Kingsley, Oxfordshire (GB); Jeffrey M. Nicholson, Franklin, MA (US)

(73) Assignee: Pitney Bowes Inc., Stamford, CT (US)

( * ) Notice: Subject to any disclaimer, the term of this patent is extended or adjusted under 35 U.S.C. 154(b) by 63 days.

(21) Appl. No.: 13/730,318

(22) Filed: Dec. 28, 2012

(65) Prior Publication Data
US 2013/0268553 A1   Oct. 10, 2013

Related U.S. Application Data (60) Provisional application No. 61/622,122, filed on Apr. 10, 2012.

(51) Int. Cl.
*G06F 17/00* (2006.01)
*G06F 17/30* (2006.01)

(52) U.S. Cl.
CPC *G06F 17/30477* (2013.01); *G06F 2203/04806* (2013.01); *G06F 17/30554* (2013.01)

(58) Field of Classification Search
CPC ............ G06F 17/30442; G06F 17/30463; G06F 17/30289; G06F 17/30864; G06F 17/30; G06F 17/30584; G06F 17/30448; G06F 17/30451; G06F 17/30457; G06F 2203/04806
USPC ......................................................... 707/713
See application file for complete search history.

(56) References Cited

U.S. PATENT DOCUMENTS

| 4,736,308 | A  | * | 4/1988  | Heckel ........................ 715/781 |
| 6,633,311 | B1 |   | 10/2003 | Douvikas et al. |
| 8,082,267 | B1 | * | 12/2011 | Murphy et al. ............... 707/769 |
| 2005/0175021 | A1 |   | 8/2005  | Ozugur et al. |
| 2007/0150444 | A1 |   | 6/2007  | Chesnais et al. |
| 2008/0034289 | A1 |   | 2/2008  | Doepke et al. |
| 2010/0037144 | A1 |   | 2/2010  | Vance et al. |
| 2011/0154259 | A1 |   | 6/2011  | Kennedy et al. |

OTHER PUBLICATIONS

International Search Report and Written Opinion in PCT/US 13/29336 Mar. 6, 2013, 5 pages.

* cited by examiner

*Primary Examiner* — Truong Vo
(74) *Attorney, Agent, or Firm* — Michael J. Cummings; Charles R. Malandra, Jr.; Steven J. Shapiro (57) ABSTRACT Systems and methods for providing database query results to a user in an intuitive graphical format are provided. The system utilizes an intuitive graphical user interface dashboard that displays top-level query statistics data and selected record cards to the user in the dashboard. The user may iteratively update the query and the displayed top-level query statistics and selected records cards are updated in real time. Each customer card include customizable fields and supports intelligent zoom to provide additional fields and data as the user zooms into each successive smaller group of cards and eventually down to opening a single customer card.

14 Claims, 5 Drawing Sheets

SYSTEMS AND METHODS FOR PROVIDING QUERY RESULTS TO A USER IN AN INTUITIVE GRAPHICAL FORMAT

CROSS REFERENCE TO RELATED APPLICATIONS

This application claims priority under 35 U.S.C. section 119(e) from Provisional Patent Application Ser. No. 61/622,122, filed Apr. 10, 2012, entitled Systems And Methods For Providing Query Results To A User In An Intuitive Graphical Format, by Patrick D. Surry, et al., which is incorporated herein by reference in its entirety.

TECHNICAL FIELD

The illustrative embodiments of the present invention relate generally to database query systems and, more particularly, to new and useful systems and methods for providing query output to a user in an intuitive graphical format.

BACKGROUND

Many large databases are utilized by companies in searches for many reasons including for marketing and targeted advertising purposes. In some instances, the databases are internal customer databases that are interrogated to help develop new marketing campaigns, new targeted marketing lists or even new products. In some instances, external data may be used. In many cases, the data sources are very large numbering into the hundreds of millions of records with each record containing all or a subset of a large number of data field types and many data fields.

Often, such companies employ database specialists to write Structured Query Language queries to implement certain database queries that have been designed along with an output report. In some instances, employees may use graphical interfaces such as data field pull down menus to design structured database queries. The output of the query is typically a report having all the records that match the query in the output report format.

Unfortunately, designing structured database queries and corresponding reports can be difficult for users who lack advanced technical computer science training and may prove less than intuitive for certain individuals such as corporate employees who most need access to the data stored in such large databases.

Accordingly, there is a need, among other needs, for systems and methods that provide intuitive database query tools and that provide results in an intuitive visual format for marketing professionals.

SUMMARY

Illustrative system and methods for providing database query output to a user in an intuitive graphical format are described. In one configuration, the system utilizes an intuitive graphical user interface dashboard that allows marketing professionals to build database queries across one or more datasets. The dashboard then displays top-level query statistics data and selected record cards in the dashboard. In the example of a direct marketing campaign system exploring existing customers, the dashboard displays customer cards in a results frame.

In certain illustrative embodiments, a random sample of customer cards is displayed in the results frame. The results frame may optionally support intelligent zoom whereby the query user can zoom into a particular segment to retrieve more customer cards and further segment the results. Ultimately, at a deep enough zoom-level, all customer cards in a particular deep zoom segment will be displayed. Similarly, for queries having a small number of resulting selected customers, all customer cards may be displayed in the results frame.

Each customer card may optionally include customizable fields from the customer database records included in the datasets being queried. Moreover, customer cards may also optionally support intelligent zoom and provide additional fields and data as the user zooms into a small group of cards and eventually down to opening a single customer card.

In at least certain embodiments, the user may intuitively view customer cards in the results frame and modify the query in real time resulting in updated results being displayed in the results frame. In this manner, the marketing professional may use the intuitive graphical results frame display to iteratively build a query such as for use in developing a targeted direct marketing campaign.

BRIEF DESCRIPTION OF THE DRAWINGS

The accompanying drawings show illustrative embodiments of the invention and, together with the general description given above and the detailed description given below serve to explain certain principles of the invention. As shown throughout the drawings, like reference numerals designate like or corresponding parts.

DETAILED DESCRIPTION

The illustrative embodiments of the present invention described herein are often described in the context of a marketing query tool that operates across one or more databases. The databases may be queried to develop targeted direct marketing campaigns or to determine the likely success of a new product offering. However, it can be appreciated that the systems and methods described herein may be useful with other query systems involving one or more databases such as those used in many different industries.

Traditionally, customer data queries have been a process of trial and error between business managers looking to apply data to marketing activities and data analytics professionals who expertly parse customer data to create customer insight. Each query often presents new segmentation information that may require clarifying queries until the two teams arrive at the best data analysis for each situation. Such a process may require a relatively long period of time. By using the systems and methods described herein, marketing professionals may obtain easier access to customer data and marketing tools so that business and marketing users can make better data-driven decisions more quickly, delivering increased productivity and more effective customer interaction management.

The systems described herein allow a broader class of users to get value from complex customer analytics and do more accurate customer targeting, more quickly and efficiently providing rapid campaign selection and segmentation. The systems may achieve increased productivity, faster decision-making, and greater campaign profitability such as by delivering intuitive, business user access to customer data.

One business problem investigated was how to provide improved systems and methods for selecting a subset of a population of customers (or other objects) to target for direct marketing action (or other intervention). Historically, target groups were identified by specifying a collection of selection clauses on customer attributes (e.g. risk score <3%; income >50K, marital status=single) which are combined by logical 'and' or 'or' operations in a Structures Query Language (SQL) query or using a query developed in an interactive graphical user interface (GUI). The collection of selection clauses are typically defined using a declarative programming language such as SQL to define the logic, or using a lightweight graphical interface to build an equivalent query.

It has been observed that certain marketing professionals were uncomfortable with abstract "programming" to define selections and create queries. It was found that some preferred to work by example ("management by anecdote"). For example, a marketing professional might consider a particular customer data point such as "this customer has a complaint" and might consider, "should I exclude all customers like that from this marketing program?" In another example, a marketing professional might initially believe that age is a driver of campaign response for a particular campaign. The marketing professional can then segment the relevant dataset by age and determine if the belief was accurate. If accurate, then the most responsive age groups can be selected.

Moreover, it was determined that marketing professionals might prefer database interaction tools that included certain user interface features that might be somewhat familiar from other contexts such as zooming in to maps online and managing digital photo albums on a computer. Photo albums can be managed using date, location, tags or other selection criteria. In certain embodiments described herein, the POR-TRAIT EXPLORER CLIENT Portrait Explorer delivers accessibility and usability to marketers for complex customer databases. Every customer is represented graphically as a "customer card" with up to dozens of customizable key attributes displayed to provide a clear customer portrait of that individual in the context of interaction with the business of the marketing professional. Customer cards can be examined individually to give deeper insight into segments and selection decisions using specific examples. The collection of cards representing all customers can be segmented or selected by any attribute, with heat maps used to highlight quality differences between segments, providing a powerful visual environment to improve targeting queries and even highlight potential data quality issues.

The systems described herein provide a unique combination of high-performance analytics (which gives exact counts and aggregate summary metrics dynamically for any segmentation or selection of millions or billions of records), and a random sample of individual customer records within each segment presented as visual "customer cards." This gives users rapid feedback to guide the selection process and determine the "right" question to ask, with customer cards allowing users to validate their decisions in an understandable way, and to model new selection choices "by example" rather than as abstract SQL selection clauses. The systems described empower business users to access customer information directly in order to perform their own ad-hoc queries and reports providing fast, actionable insight without the need for power analysts or the delay of interfacing with Information Technology (IT) departments. The business users can timely obtain customer insights and address many questions such as "Which customers reacted positively to a recent marketing offer?" and "Which customers recently contacted the company with a complaint?" to "How do I understand who are my highest value customers?"

The illustrative PORTRAIT EXPLORER system described herein combines elements of a traditional query builder (ability to define selection clauses on customer attributes), with a visual representation of the customer base that allows a much more immediate and intuitive approach to identifying relevant customers. The visual paradigm conceptually shows every individual as a "customer card" (akin to a baseball card or other collectible trading card) that shows key attributes of the individual in a visual 'dashboard' format. The interface allows the customer to logically zoom from a "bird's eye view" of all customers (cards) spread across a table—where they can be organized in different dimensions (e.g. collect by age, or by income) with exact counts and other metrics reported for each group—down to an individual customer's card, which can be "picked up" to observe that customer's attributes and to select "by example" (or "by counterexample") other customers with similar (or different) values of those attributes.

Figure 1:
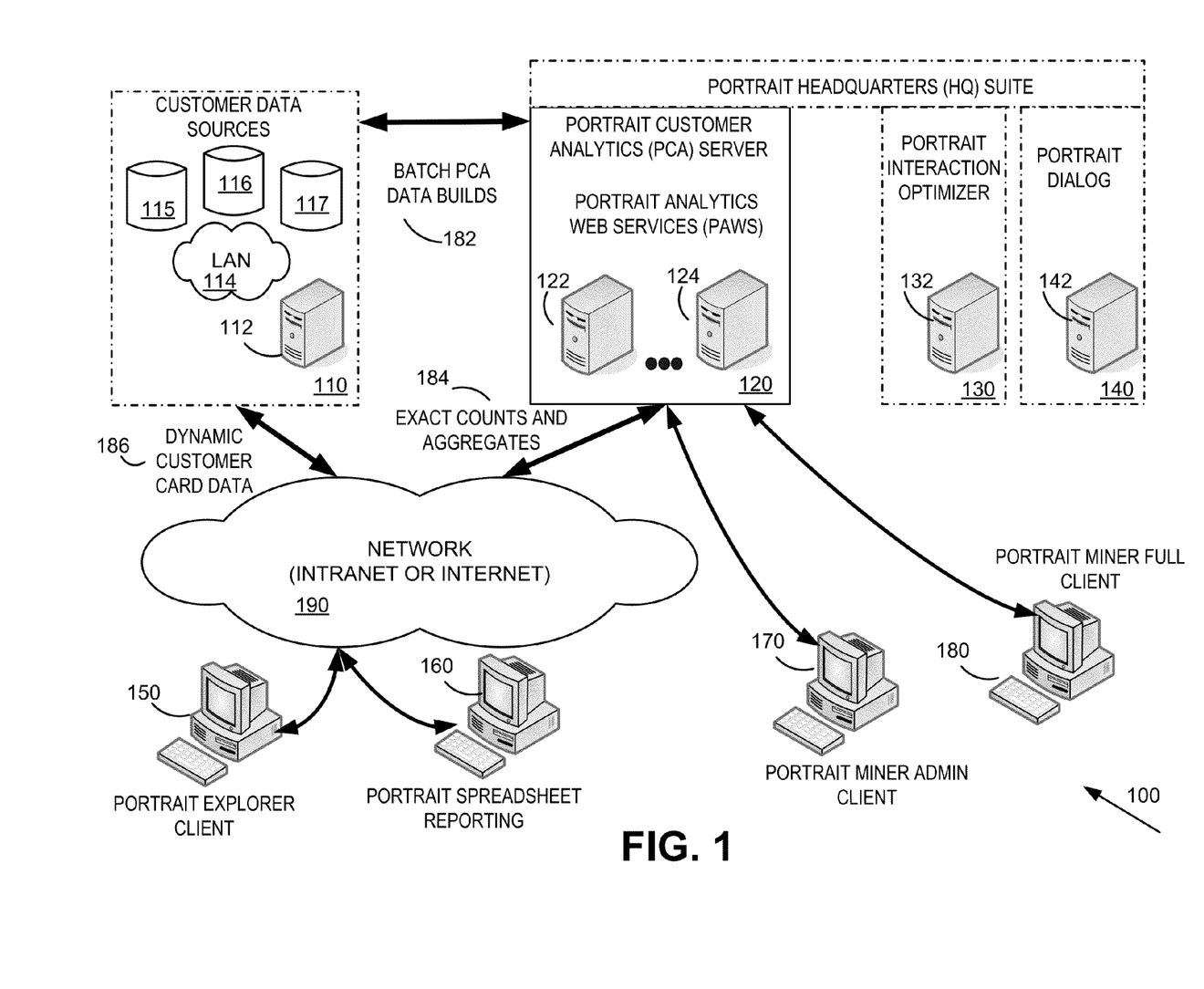
FIG. 1 is a diagram showing a system and information flow for providing query output to a user in an intuitive graphical format according to an illustrative embodiment of the present application.

Referring to FIG. 1, a diagram showing a system 100 and information flow for providing query output to a user in an intuitive graphical format according to an illustrative embodiment of the present application is shown. Here, the new POR-TRAIT EXPLORER CLIENT is shown running on a standalone Personal Computer (PC) 150 and is used to display sample results or full results to the user in a results card format such as a customer card used with retail customer databases. The systems described herein are typically interconnected using a network 190 such as an Intranet or the Internet with appropriate security such as a Virtual Private Network (VPN).

The illustrative systems and methods described herein may operate on many types of databases with illustrative customer data sources 110 shown. Alternatively, the databases may be internal, external or a combination. Customer data sources 110 in this illustrative embodiment contains a server 112, a local are network (LAN) 114 and three databases 115, 116 and 117. The database datasets may contain customer data or prospective customer data. Alternatively, other types of databases may be used. Here, the systems and methods may use data query templates, results display templates and results file output templates. As described herein, the user may be presented with a representative visual results display and a comprehensive results output may be provided in an appropriate data format.

The PORTRAIT MINER ADMIN Client 170 is operatively connected to the PORTRAIT CUSTOMER ANALYT-ICS (PCA) Server 122 to create batch PCA data builds 182 that are received from customer data sources 110. The ADMIN client 170 may be used to select relevant templates or to build query templates and customer card format templates. PORTRAIT ANALYTICS WEB SERVICES (PAWS) implement relevant web services functionality described herein using server 124. Here, the PORTRAIT HEADQUARTERS (HQ) SUITE 120 may be used or the PCA and PAWS servers may be implemented.

When the user submits a query through the PORTRAIT EXPLORER Client 150, the PCA 122 and/or PAWS 124 server provide query data 184 such as exact count and aggregate information for display to the user and a representative sample of records identifiers such as randomly sampled selected customer identifiers. The system also pulls customer card specific record data for each of the representative sample of customers for display to the user in a results frame in the display of Client 150.

Optionally, other PORTRAIT HQ systems including the PORTRAIT INTERACTION OPTIMIZER 130 with associated server 132 may be utilized and the PORTRAIT DIALOG system 140 including associated server 142 may be used. Additionally, a full PORTRAIT MINER client 180 may be utilized to provide additional functionality over that available in the Admin client 170. The PORTRAIT SPREADSHEET REPORTING system 160 processes full results data output in certain configurations into a format such as MICROSOFT EXCEL.

In one preferred embodiment, the PORTRAIT EXPLORER CLIENT is deployed on a personal computer using the MICROSOFT SILVERLIGHT system. In another embodiment, the ADOBE FLASH system may be utilized. In an alternative that does not implement all of the functionality described herein, the MICROSOFT PIVOT system may be used to implement an alternative of the functionality described herein.

In certain embodiments described herein, a targeted marketing query system will provide sample query output records to a user in an intuitive graphical representation. In these embodiments, the sample may represent 1 percent or less of the query record output. For example, the query user may develop a query and run the query against one or more databases. The results may number in the thousands or hundreds of even millions of records. A sample of the records that may be representative in certain respects may then be displayed to the query user in an intuitive graphical format such as a group of "player cards." This query sample tool may then allow the user to formally or informally test the query to determine if expected types of records have been found. If so, the user may then use the full or some partial results of the query for the intended purpose such as developing a direct marketing mailing list. If the query is found lacking in some way, the user could iteratively modify the query and test the respective updated visual sample display until the user is satisfied.

However, in another alternative embodiment, the user may be presented with the entire results of the query in player card or similar graphical format. In such cases, the display may be the final format and intended final output of the query for use by the query user.

Figure 2:
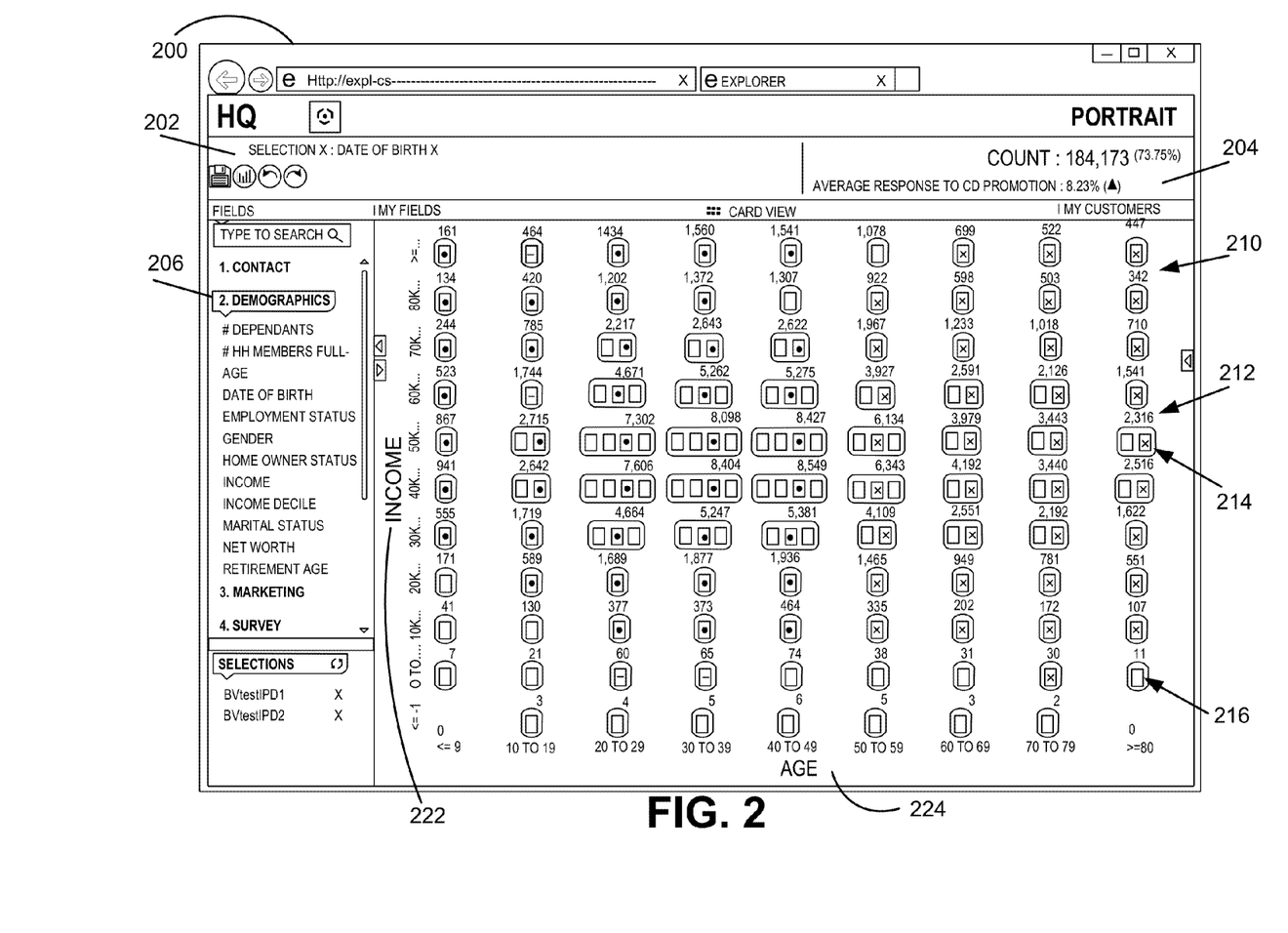
FIG. 2 is a user interface diagram showing a process for displaying query results data and representative record cards in a results frame in a graphical user interface format to the user according to an illustrative embodiment of the present application.

Referring to FIG. 2, a user interface diagram 200 showing a process for displaying query results data and representative record cards in a results frame in a graphical user interface format to the user according to an illustrative embodiment of the present application is shown. Here, PORTRAIT EXPLORER client window 200 includes a selection summary toolbar 202 and an exact results count and associated data frame 204. A query frame 206 provides access to query elements relevant to the available datasets such as income and age in this example. Here, the company employing the marketing professional user is a banking institution and the product in question is a particular Certificate of Deposit (CD) offering. In the results field 210, the vertical axis break points are set for income at levels shown 222 and the horizontal axis break points are set for age levels shown 224. Each cell of the results matrix includes an exact results number 212 and representative customer cards 214 at a zoom level. In some cases, a single representative card is shown 216 for a small results group.

Moreover, colors are used to quickly and intuitively display results such as the number of customers who have a particular product in their portfolio. Alternatively a take rate for one or more previous marketing campaigns can be displayed. Here, most of the card groups at age 50 and above are green, with a few gray. Most of the ages 49 and below are red with a few orange and a few gray. The user can zoom in to see particular cards to determine if the search yielded expected results. If not, perhaps a new query would be formed.

Figure 3:
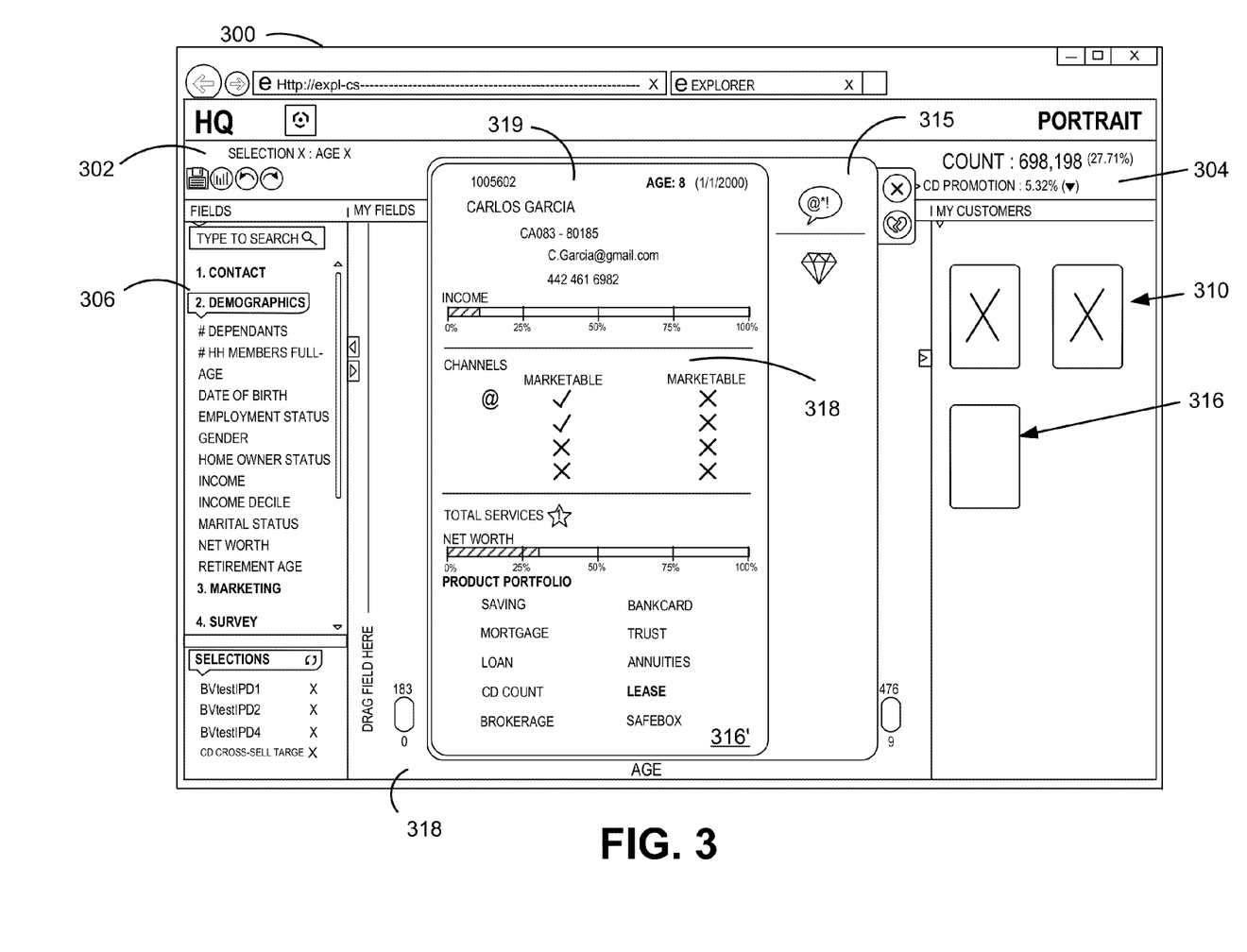
FIG. 3 is a user interface diagram showing a process for displaying an individual customer record card in the foreground of a query results frame according to an illustrative embodiment of the present application.

Referring to FIG. 3, a user interface diagram 300 showing a process for displaying an individual customer record card in the foreground of a query results frame according to an illustrative embodiment of the present application is shown. Here, PORTRAIT EXPLORER client window 300 includes a selection summary toolbar 302 and an exact results count and associated data frame 304. A query frame 306 provides access to query elements relevant to the available datasets such as age in this example. Here, the company employing the marketing professional user is a banking institution and the product in question is a particular Certificate of Deposit (CD) promotional offering. In the results field 310, several cards have been zoomed into and display a medium card detail 316.

When card 316 is selected, a large foreground version 316' is displayed in front of the results display frame 310. The customer card 316' has a high level of data including many fields not displayed at the medium level card 316. Here, a customer section 319 provides customer information such as name, identifier and contact information. Section 318 provides marketing channel information such as preferences and do not call data. Section 318 provides bank product information. Section 315 provides data symbology such as symbols from the PITNEY BOWES SOFTWARE PSYTE FINANCIAL SEGMENTATION codes. The top icon in section 315 indicates that this customer has filed a complaint with the bank. Accordingly, the marketing professional might wish to exclude the individual from a new product offering that requires a high level of satisfaction.

Here, the My Customers panel is shown in the results frame 310. The Heart icon on customer card 316' below the typical X close icon is shown as a broken heart action because Carlos is already in My Customers. This determines whether that particular individual is an interesting one in the results records that a user might want to watch. The flagged customers are placed in the My Customers panel at the right of the results frame 310, which acts like a virtual focus group. The given set of customers is always tracked throughout your selection process and the software indicates whether each customer is included or excluded by the current selection criteria. This feature helps the non-technical user makes sure their selection logic is doing what they think it is (helps to validate and diagnose errors), as well as potentially suggesting additional criteria that should be added or removed based on the specific attributes observed for their favorite customers.

Figure 4:
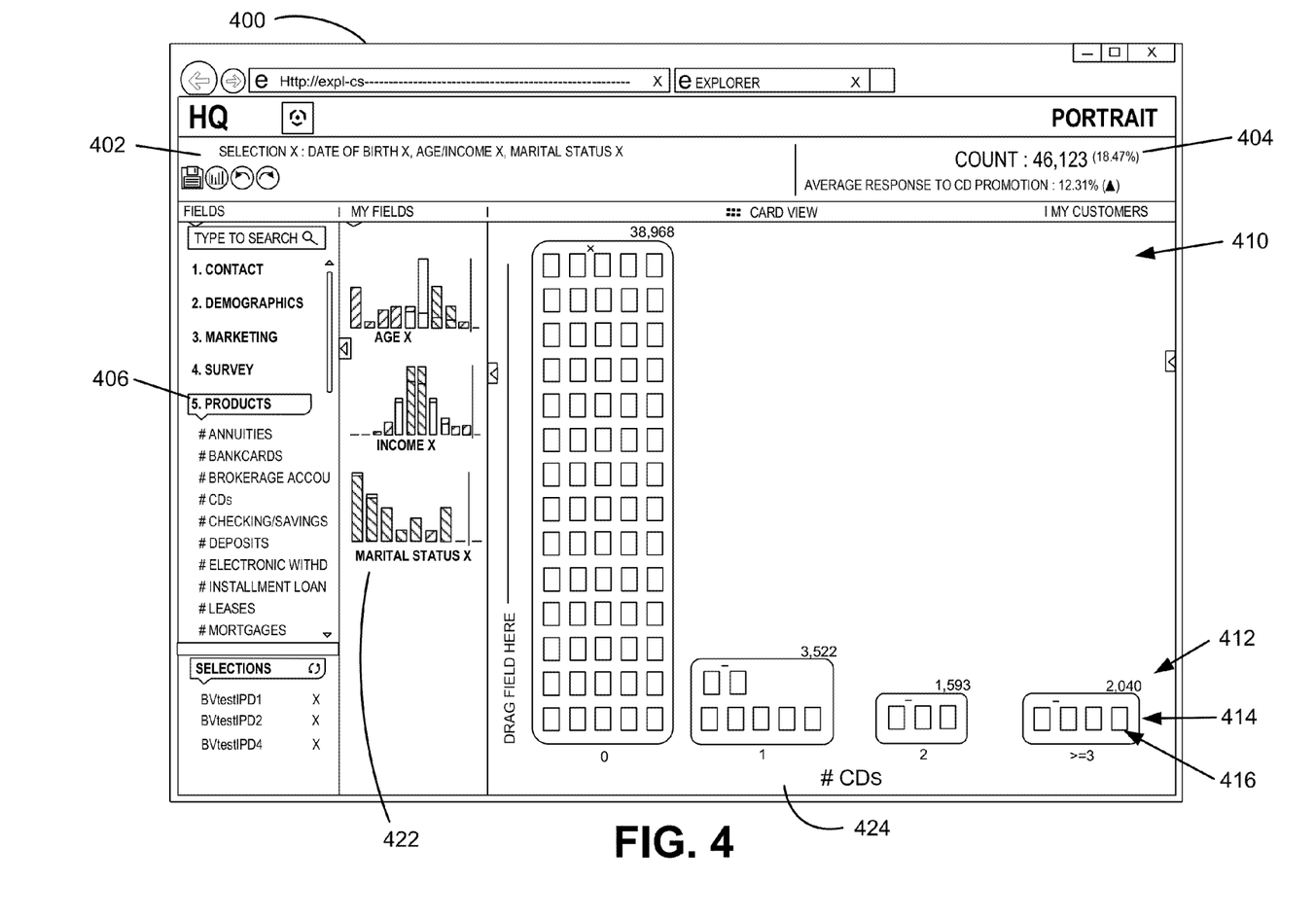
FIG. 4 is a user interface diagram showing a process for displaying query results data and representative record cards in a current products results frame in a graphical user interface format to the user according to an illustrative embodiment of the present application.

Referring to FIG. 4, a user interface diagram 400 showing a process for displaying query results data and representative record cards in a current products results frame in a graphical user interface format to the user according to an illustrative embodiment of the present application is shown. Here, PORTRAIT EXPLORER client window 400 includes a selection summary toolbar 402 and an exact results count and associated data frame 404. A query frame 406 provides access to query elements relevant to the available datasets such as particular products held such as CDs in this example. Here, the company employing the marketing professional user is a banking institution and the product in question is the number of a particular Certificate of Deposit (CD) held in the account 424. In the results field 410, the horizontal axis is set to the number of CDs held. The histogram charts 422 show the results segmented by fields such as age, income and marital status. Each cell of the results matrix includes an exact results number 412 and representative group of customer cards 414 at a zoom level with several cards 416.

Figure 5:
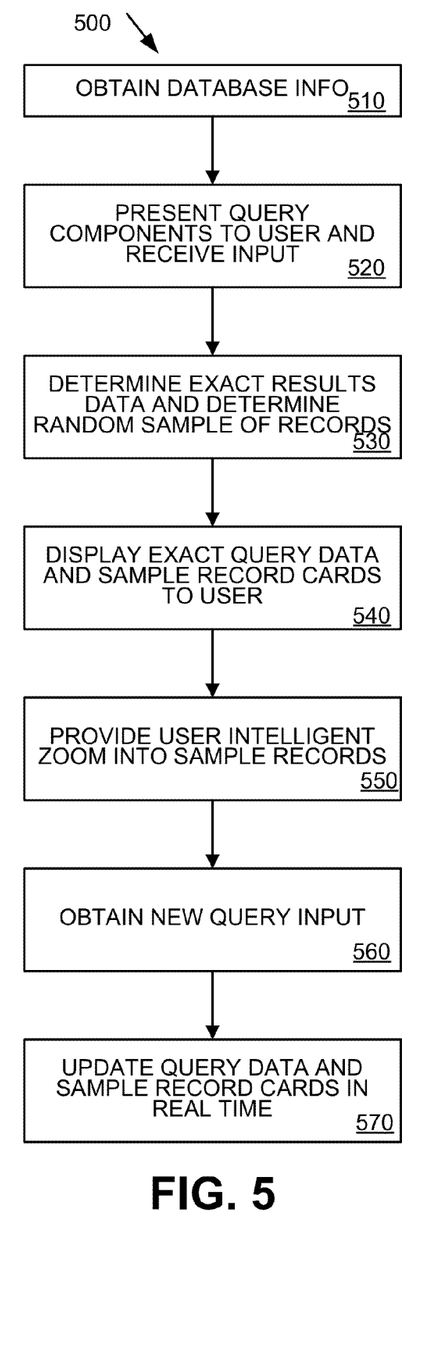
FIG. 5 is a process flow diagram showing a process for iteratively querying one or more databases and displaying representative record cards results according to an illustrative embodiment of the present application.

Referring to FIG. 5, a process flow diagram showing a process 500 for iteratively querying one or more databases and displaying representative record cards results according to an illustrative embodiment of the present application is shown. In step 510, the Admin client is utilized to setup database access and to provide batch PCA data builds to the PCA and PAWS servers. In step 520, the PORTRAIT EXPLORER presents query elements to the user in a graphical user interface and receives user query input. In step 530, the PORTRAIT Analytics system(s) determine the exact count of results and randomly selects a representative sample of selected record identifiers. In step 540, the exact count and related data along with the sample customer cards are displayed to the user. Data to create the customer cards is obtained on the fly from the customer data sources using the provided selected customer identifiers.

In step 550, the user is provided intelligent zoom capabilities to zoom into the various sample customer record cards. In step 560, the system receives new interactive query data from the user. In step 570, the system updates the exact query results and associated data to reflect the new query data and updates the representative sample of selected customer record cards in real time.

Figure 6:
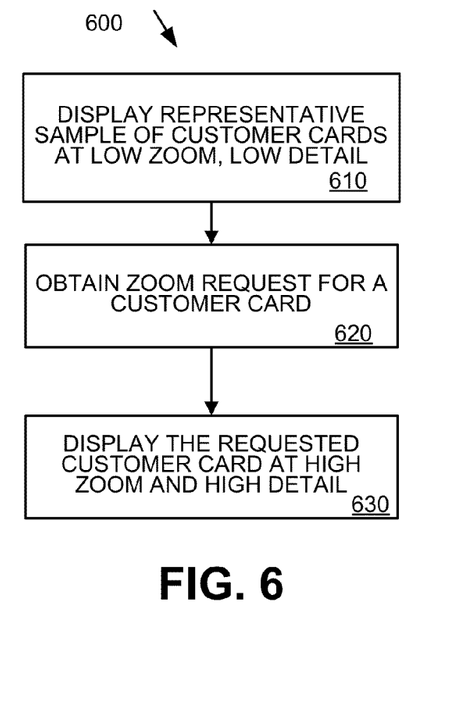
FIG. 6 is a process flow diagram showing a process for iteratively zooming in to a record card display and providing additional record fields for at least one zoom level according to an illustrative embodiment of the present application.

Referring to FIG. 6, a process flow diagram showing a process 600 for iteratively zooming in to a record card display and providing additional record fields for at least one zoom level according to an illustrative embodiment of the present application. In step 610, the system provides representative random selected customer record cards at a first relatively low zoom level having a relatively low level of detail and record field information. In step 620, the user selects a customer record card. In step 630, the system displays the record card at a second relatively high zoom level having a relatively high level of detail such as a customer photo and detailed record field information.

Certain components and subsystems described herein include and/or are enhanced modified versions of commercially available systems that may be obtained from PITNEY BOWES SOFTWARE INC. of Troy, N.Y. and PITNEY BOWES INC. of Stamford, Conn. For example, PORTRAIT HEADQUARTERS (HQ) SUITE is available in certain versions as is PORTRAIT MINER. The servers described are typically DELL INTEL architecture servers using the WINDOWS SERVER operating system and MICROSOFT SQL and/or ORACLE 10i database software.

The various systems and subsystems described herein may alternatively reside on a different configuration of hardware such as a single server or distributed server such as providing load balancing and redundancy. Alternatively, the described systems may be developed using general purpose software development tools including Java and/or C++ development suites. The server systems described herein typically include WINDOWS/INTEL Servers such as a DELL POWEREDGE Server and include database software including MICROSOFT SQL and/or ORACLE 10i software. Alternatively, other servers such a SUN FIRE T2000 and associated web server software such as SOLARIS and JAVA ENTERPRISE and JAVA SYSTEM SUITES may be obtained from several vendors including Sun Microsystems, Inc. of Santa Clara, Calif. PC. Alternative database systems such as SQL may be utilized.

The user computing systems described may include WINDOWS/INTEL architecture systems running WINDOWS and INTERNET EXPLORER BROWSER such as the DELL DIMENSION E520 available from Dell Computer Corporation of Round Rock, Tex. While the electronic communications networks have been described as physically secure local area network (LAN) connections in a facility, external or wider area connections such as secure Internet connections may be used. Other communications channels such as Wide Area Networks, telephony and wireless communications channels may be used. One or more or all of the data connections may be protected by cryptographic systems and/or processes. Each computer may include one or more operating systems, appropriate commercially available software, one or more displays, wireless and/or wired communications adapter(s) such as network adapters, nonvolatile storage such as magnetic or solid state storage, optical disks, volatile storage such as RAM memory, one or more processors, serial or other data interfaces and user input devices such as keyboard, mouse and audio/visual interfaces. Laptops, tablets, PDAs and smart phones may alternatively be used herein.

Although the invention has been described with respect to particular illustrative embodiments thereof, it will be understood by those skilled in the art that the foregoing and various other changes, omissions and deviations in the form and detail thereof may be made without departing from the scope of this invention.

What is claimed is:

1. A system for displaying database query output to a user in an intuitive graphical format, the system comprising:
   a first processor for processing a query and selecting results for display;
   at least one database operatively connected to the first processor for providing record details for the results selected for display; and
   the first processor configured to display record cards to the user and to display a plurality of returned record cards to the user in a dashboard comprising a results frame having one or more results groups of record cards defined by selected fields, wherein a number of the cards consisting of the displayed plurality of returned record cards is determined by a display zoom level;
   wherein the first processor is further configured to display an associated results data field adjacent to a plurality of returned record cards including a sample of record cards in each of the one or more results groups, defined by one or more selected fields.

2. The system of claim 1, wherein,
   the displayed plurality of returned record cards is randomly selected.

3. The system of claim 1, wherein,
   each one of the displayed plurality of returned record cards is displayed at a level of detail associated with a card zoom level.

4. The system of claim 1, wherein,
the associated results data field displays the total number of responsive record cards defined by the one or more respective selected fields.

5. The system of claim 1, further comprising:
the first processor further configured to display at least one of the record cards having a first number of fields at a first zoom level and a second number of fields at a second zoom level.

6. The system of claim 5, wherein,
a set of fields displayed at each zoom level for each record card may be configured.

7. The system of claim 1, further comprising:
the first processor further configured to display at least two selectable fields having selectable query values in the dashboard adjacent to the results frame.

8. A method for displaying database query output to a user in an intuitive graphical format, the method comprising:
receiving a query including one or more query values from the user, each associated with a field of a searchable set of data;
determining resulting records of the searchable set of data from the query;
displaying a dashboard to the user including query results data; and
displaying a plurality of record cards to the user, each record card associated with a resulting record:
displaying the plurality of record cards to the user in a results frame of the dashboard, wherein the displayed record cards are selected in accordance with fields selected by the user for the results frame and a number of the cards consisting of the displayed plurality of record cards is determined by a display zoom level; and
displaying an associated results data field adjacent to a plurality of displayed record cards configured in a results group.

9. The method of claim 8, wherein,
the displayed plurality of record cards is a subset of the returned record cards and is randomly selected.

10. The method of claim 8, wherein,
each one of the displayed plurality of record cards is displayed at a level of detail associated with a card zoom level.

11. The method of claim 8, wherein,
the associated results data field displays the total number of responsive record cards defined by the one or more respective selected fields associated with the results group.

12. The method of claim 8, further comprising:
displaying at least one of the record cards having a first number of fields at a first zoom level and a second number of fields at a second zoom level.

13. The method of claim 12, wherein,
a set of fields displayed at each of at least two zoom levels for each record card may be configured.

14. The method of claim 8, further comprising:
displaying at least two selectable fields having selectable query values in the dashboard adjacent to the results frame.

* * * * *